United States Patent
Lin et al.

(10) Patent No.: US 8,209,737 B2
(45) Date of Patent: Jun. 26, 2012

(54) APPARATUS AND METHOD OF CONTROLLING A CONSUMER PRODUCT

(75) Inventors: Chi Chia Lin, Tainan County (TW); Shu Ming Liu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 463 days.

(21) Appl. No.: 11/865,216

(22) Filed: Oct. 1, 2007

(65) Prior Publication Data

US 2008/0301753 A1 Dec. 4, 2008

(30) Foreign Application Priority Data

May 30, 2007 (TW) .............................. 96119234 A

(51) Int. Cl.
*H04N 7/16* (2011.01)

(52) U.S. Cl. ........ 725/152; 725/153; 725/140; 725/141; 348/734; 345/158; 345/160; 345/161; 345/163; 345/168; 719/322; 719/327

(58) Field of Classification Search .......... 725/131–133, 725/139–141, 151–153; 345/156–184; 719/310–332

See application file for complete search history.

(56) References Cited

U.S. PATENT DOCUMENTS

| | | | | |
|---|---|---|---|---|
| 5,838,383 | A * | 11/1998 | Chimoto et al. | 348/553 |
| 6,005,551 | A * | 12/1999 | Osborne et al. | 345/161 |
| 6,469,742 | B1 * | 10/2002 | Trovato et al. | 348/553 |
| 6,978,424 | B2 * | 12/2005 | Safadi | 715/765 |
| 7,293,236 | B2 * | 11/2007 | Choi et al. | 715/734 |
| 2003/0083026 | A1 * | 5/2003 | Liu | 455/127 |
| 2004/0119894 | A1 * | 6/2004 | Higgins et al. | 348/734 |
| 2005/0235294 | A1 * | 10/2005 | Kimura et al. | 719/328 |
| 2006/0041924 | A1 * | 2/2006 | Bushmitch et al. | 725/132 |
| 2007/0124772 | A1 * | 5/2007 | Bennett et al. | 725/61 |
| 2007/0150930 | A1 * | 6/2007 | Koivisto et al. | 725/134 |
| 2007/0176910 | A1 * | 8/2007 | Simek et al. | 345/184 |
| 2007/0192804 | A1 * | 8/2007 | Kim et al. | 725/61 |
| 2008/0022322 | A1 * | 1/2008 | Grannan et al. | 725/78 |
| 2009/0113417 | A1 * | 4/2009 | Vrijsen | 717/178 |
| 2009/0213134 | A1 * | 8/2009 | Stephanick et al. | 345/589 |

FOREIGN PATENT DOCUMENTS

WO    WO 2006095290 A2 *  9/2006

\* cited by examiner

*Primary Examiner* — Dominic D Saltarelli
*Assistant Examiner* — Jason J Chung
(74) *Attorney, Agent, or Firm* — WPAT, P.C.; Anthony King

(57) ABSTRACT

The apparatus and method of controlling a consumer product includes the step of connecting an input device to the consumer product. Also, an input event of the input device is translated into at least one key code, where the key code is recognized by a middleware of the consumer product. Furthermore, the at least one key code is transmitted to the consumer product. In addition, the at least one key code is executed by an application program of the middleware so as to control the consumer product.

18 Claims, 3 Drawing Sheets

APPARATUS AND METHOD OF CONTROLLING A CONSUMER PRODUCT

BACKGROUND OF THE INVENTION

1. Field of the Invention

The present invention relates to an apparatus and method of controlling a consumer product, and more particularly to an apparatus and method which need not add or modify the original hardware of the consumer product when a new input device is connected to the consumer product.

2. Description of the Related Art

Currently a consumer product, such as a set-top-box, provides a middleware to let a software programmer develop a program in the set-top-box. The middleware like DVB-MHP (Digital Video Broadcast-Multimedia Home Platform), DCAP (Distributed Control Application Platform) or ARIB (Association of Radio Industries and Business) acts as a software platform or application program interface, in which a program is executed to control the set-top-box.

However, the DVB-MHP limits its recognized input device only to a remote controller (RC) and a keyboard. In most cases, the remote controller is most popularly used. In addition, the applicable software of the DVB-MHP defines only a few specific key events. If a user wants to use input devices other than the limited applicable input devices, such as a joystick, a steering wheel, a mouse, etc., some hardware expansions, such as USB port and XBOX port, will be unavoidable. In addition, the DVB-MHP is required to add new definition for events of these input devices. Therefore, providing a new apparatus and method to support and be compatible with the original set-top-box under a low-cost consideration is a very important issue.

SUMMARY OF THE INVENTION

The apparatus of controlling a consumer product according to an embodiment of the present invention includes an input event receiver, an input event translator and a signal transmitter. The input event receiver receives an input event. The input event translator associates the input event of the input event receiver with a plurality of key codes defined by a middleware of the consumer product. The signal transmitter is configured to send each of the key codes within a predetermined period to the consumer product.

The apparatus of controlling a consumer product according to another embodiment of the present invention includes an input device, a remote controller and a connector. The input device includes an input event receiver receiving an input event and an input event translator associating the input event of the input event receiver with a plurality of key codes defined by a middleware of the consumer product. The remote controller is configured to send each of the key codes within a predetermined period to the consumer product. The connector is configured to connect the input event translator to the remote controller.

The method of controlling a consumer product according to an embodiment of the present invention comprises the step of connecting an input device to the consumer product. Also, an input event of the input device is translated into at least one key code, where the key code is recognized by a middleware of the consumer product. Furthermore, the at least one key code is transmitted to the consumer product. In addition, the at least one key code is executed by an application program of the middleware so as to control the consumer product.

BRIEF DESCRIPTION OF THE DRAWINGS

The invention will be described according to the appended drawings in which.

PREFERRED EMBODIMENT OF THE PRESENT INVENTION

The present invention can be implemented in consumer products, which might have limited applicable input devices. The consumer products could be a TV, DVD player, set-top-box, TV with an embedded set-top-box therein, etc. The limited applicable input devices could be a remote controller, keyboard, USB ports, 1394 ports, etc. The following embodiments use a set-top-box as an example to illustrate the invention, but the present invention does not limit its claim scope only for the set-top-box.

Normally, the middleware like DVB-MHP defines a minimum set of key codes to control the set-top-box. The key codes, for example, includes VK_UP, VK_DOWN, VK_LEFT, VK_RIGHT, VK_ENTER, VK_TELETEXT, VK_0, VK_1, VK_2, VK_3, VK_4, VK_5, VK_6, VK_7, VK_8, VK_9, VK_COLORED_KEY_0, VK_COLORED_KEY_1, VK_COLORED_KEY_2 and VK_COLORED_KEY_3. Besides, the key type is limited to KEY_PRESSED only. An application program, which is programmed based on the middleware and set up in advance to correspond to the apparatus of the present invention other than the limited existing input devices, interprets the meanings of the key codes and then drives the set-top-box to do what the apparatus of the present invention wants.

Figure 1:
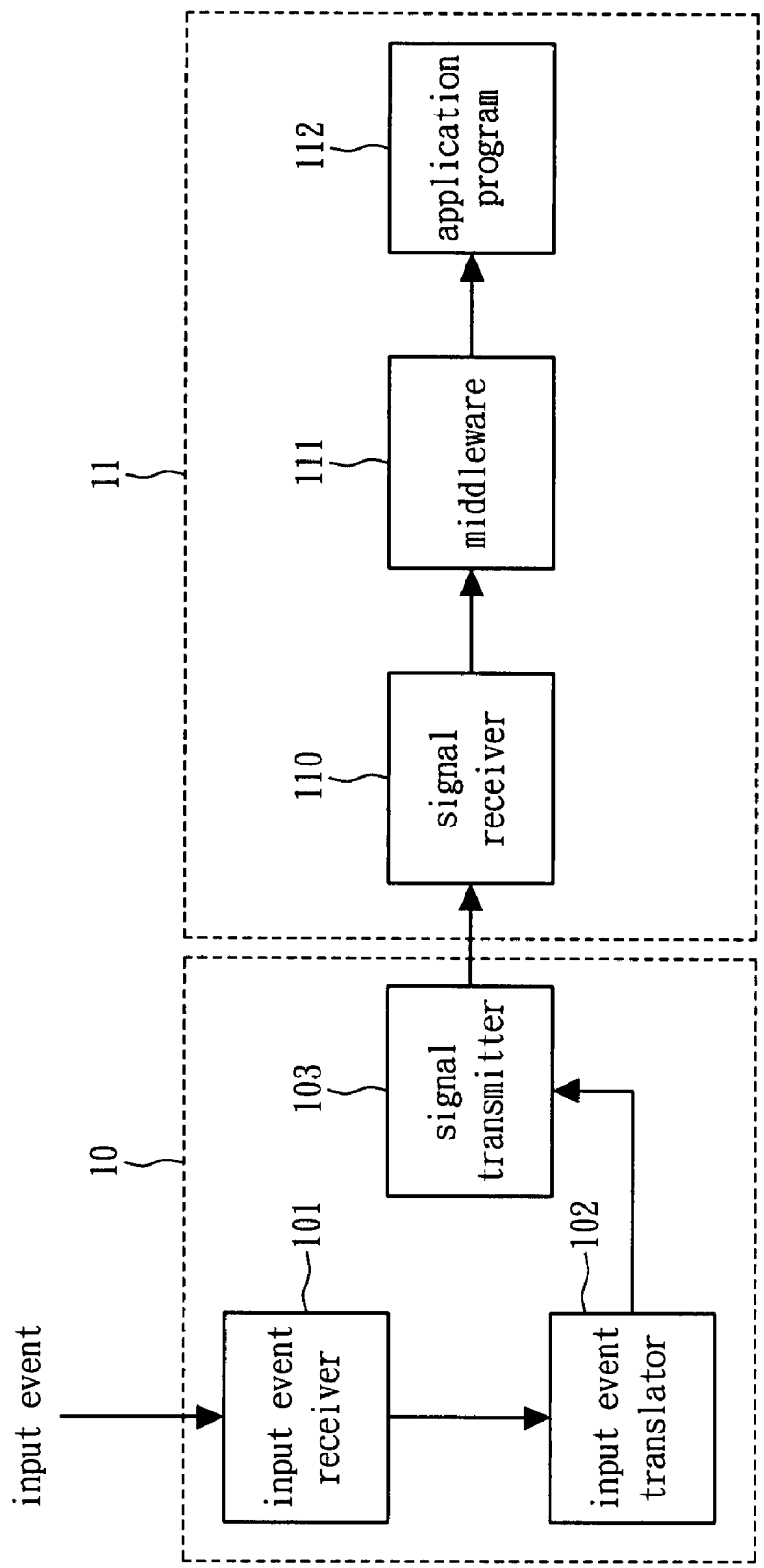
FIG. 1 shows an apparatus in accordance with an embodiment of the present invention.

FIG. 1 shows an apparatus according to an embodiment of the present invention. The apparatus 10 is not any one of the limited applicable input devices, such as a remote controller, of the set-top-box 11. The apparatus 10, such as an input device with buttons only, a steering wheel, a joystick or a mouse, includes an input event receiver 101, an input event translator 102 and a signal transmitter 103. The input event receiver 101 receives an input event, which is caused by a user. The input event translator 102 associates the input event of the input event receiver 101 with a plurality of key codes defined by a middleware 111 of the set-top-box 11. The signal transmitter 103, such as an infrared transmitter, is configured to send each of the key codes within a predetermined period to the set-top-box 11. In the other hand, the set-top-box 11 has a signal receiver 110, a middleware 111 and an application program 112. The signal receiver 110, such as an infrared receiver, is used to receive the signals transmitted from the signal transmitter 103. The received data includes key codes, which are sent to the middleware 111 for further interpretation. The application program 112, which is programmed based on the middleware and is set up in advance to correspond to the input device, interprets their meanings and drives the set-top-box to do what the input device wants.

If classified by a motion range, the input devices include three types. Those are input devices with no motion range, such as devices that have buttons only, with fixed motion range, such as a steering wheel or joystick, and with free motion range, such as a mouse. If classified by dimensions of the motion, the input devices include three types. Those are input devices with zero-dimensional motion, such as devices that have buttons only, with one-dimensional motion, such as a steering wheel, with two-dimensional motion, such as a joystick and mouse, and with three-dimensional motion, such as a motion sensor.

Assuming a remote controller has a minimum time interval $I_{RC}$ between two input events and the number of key codes is X, where X is a positive integer. Table 1 as below illustrates the correspondence between the key codes and the input events.

TABLE 1

| Dimension | No motion range | Fixed motion range | Free motion range |
|---|---|---|---|
| Zero | X | N/A | N/A |
| One | N/A | Dividing limited range by X | Dividing X-axis into X vectors |
| Two | N/A | Dividing limited range by X * X | Dividing X and Y-axes into X vectors, respectively |
| Three | N/A | Dividing limited range by X * X * X | Dividing X, Y and Z-axes into X vectors, respectively |

If control means of the input device has buttons only, the input event is translated into the key code according to a one-to-one mapping basis. For example, a button "up" corresponds to VK_UP, and a button "launch" corresponds to VK_COLORED_KEY_0. If control means of the input device has a limited one, two or three-dimensional motion range, the input event will be a point, which is translated into one, two or three corresponding key codes according to the position of the input event relating to the divided regions. For example, (VK_0) represents a one-dimensional coordinate with a leftmost position, (VK_0, VK_9) represents a two-dimensional coordinate with an upper left position, (VK_0, VK_0, VK_0) represents a three-dimensional coordinate with an initial position. If the motion of control means of the input device has an unlimited one, two or three-dimensional range, the input event will be a vector, which is translated into one, two or three corresponding key codes according to the position of the input event relating to the divided vectors. For example, (VK_9) represents an X-axis vector with a fastest speed level of "+5" between the levels "−4" and "+5" goes leftwards, (VK_9, VK_0) represents a two-dimensional vector with a fastest speed level of "+5, −4" goes towards the bottom right direction, (VK_9, VK_9, VK_9) represents a three-dimensional vector with a fastest speed level of "+5, +5, +5" goes towards the top right direction.

The one, two or three-dimensional input device delivers one, two or three signals with respect to one input event to the remote controller, respectively. For example, an input device, which has only buttons, belongs to a zero-dimensional and no-motion-range device. If a button is pressed, only one corresponding remote-controller signal (RC signal) is transmitted. Another example is a joystick, which is two-dimensional and fixed motion range input device. If the joystick is moved to a new position, two corresponding RC signals representing the coordinate of a new position (x, y) are transmitted. For a mouse, which is a two-dimensional and free-motion-range input device, two corresponding RC signals representing a motion vector (x, y) are transmitted in a predetermined period. The zero and one-dimensional input devices need only one RC signal to transmit, and therefore has a fastest speed, which is proportional to $$\frac{1}{I_{RC}},$$

where $I_{RC}$ represents the least time needed to transmit a RC signal The two-dimensional input devices needs two RC signals to transmit, and therefore has a medium speed, which is proportional to $$\frac{1}{2 \times I_{RC}}.$$

The third-dimensional input devices needs three RC signals to transmit, and therefore has a lowest speed, which is proportional to $$\frac{1}{3 \times I_{RC}}.$$

Figure 2:
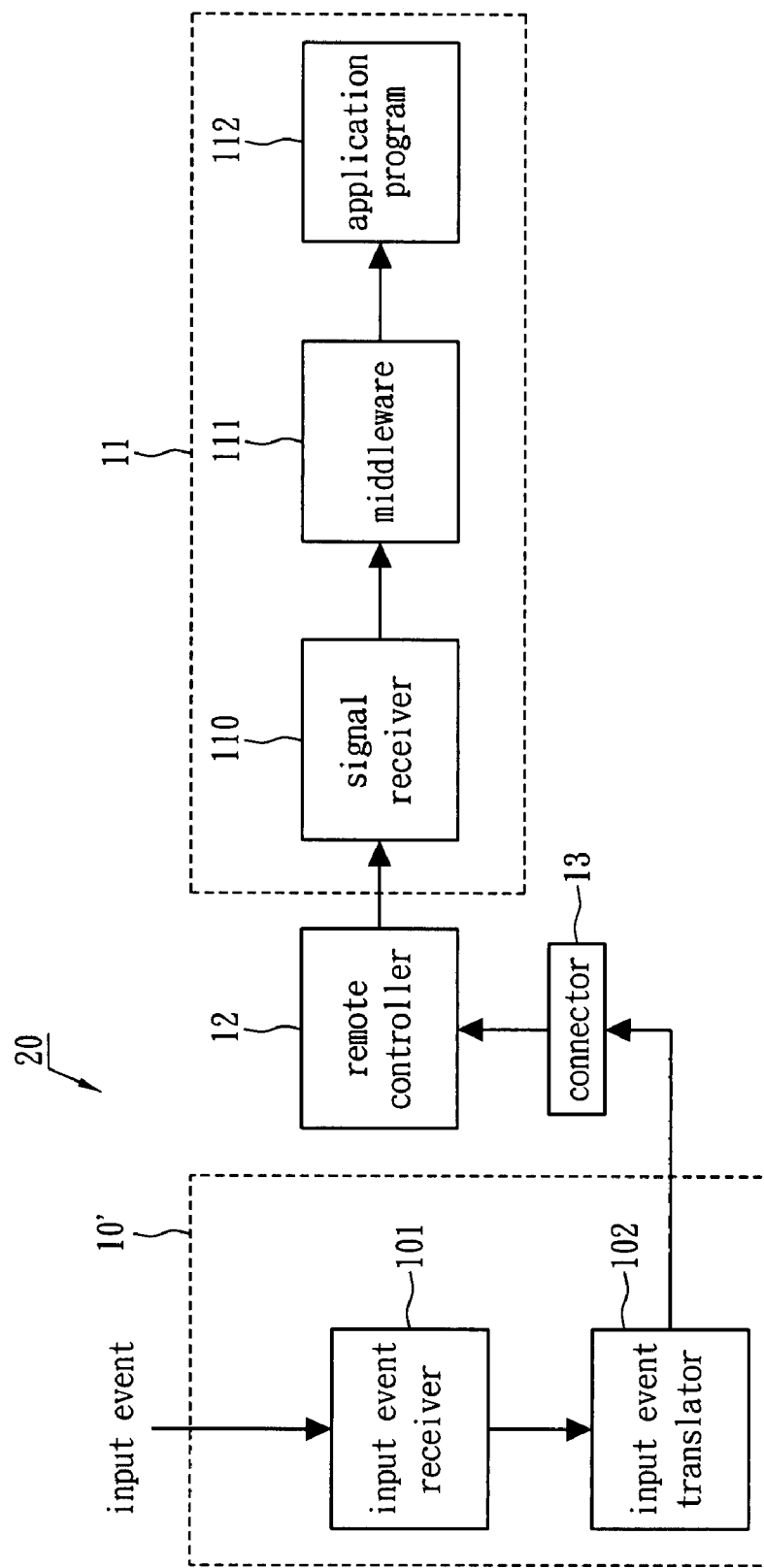
FIG. 2 shows an apparatus in accordance with another embodiment of the present invention.

FIG. 2 shows an apparatus according to an embodiment of the present invention. Similarly to FIG. 1, the apparatus 20 is not any one of the limited applicable input devices. The apparatus 20 includes an input device 10', a remote controller 12 and a connector 13. The input device 10' includes an input event receiver 101, which receives an input event, and an input event translator 102, which associates the input event of the input event receiver 101 with a plurality of key codes defined by a middleware 111 of the set-top-box 11. The remote controller 12 is configured to send each of the key codes within a predetermined period to the set-top-box 11. Commonly speaking, the remote controller 12 is attached to the package of the set-top-box 11 when the buyer bought it. The connector 13 is configured to connect the input event translator 102 to the remote controller 12.

Figure 3:
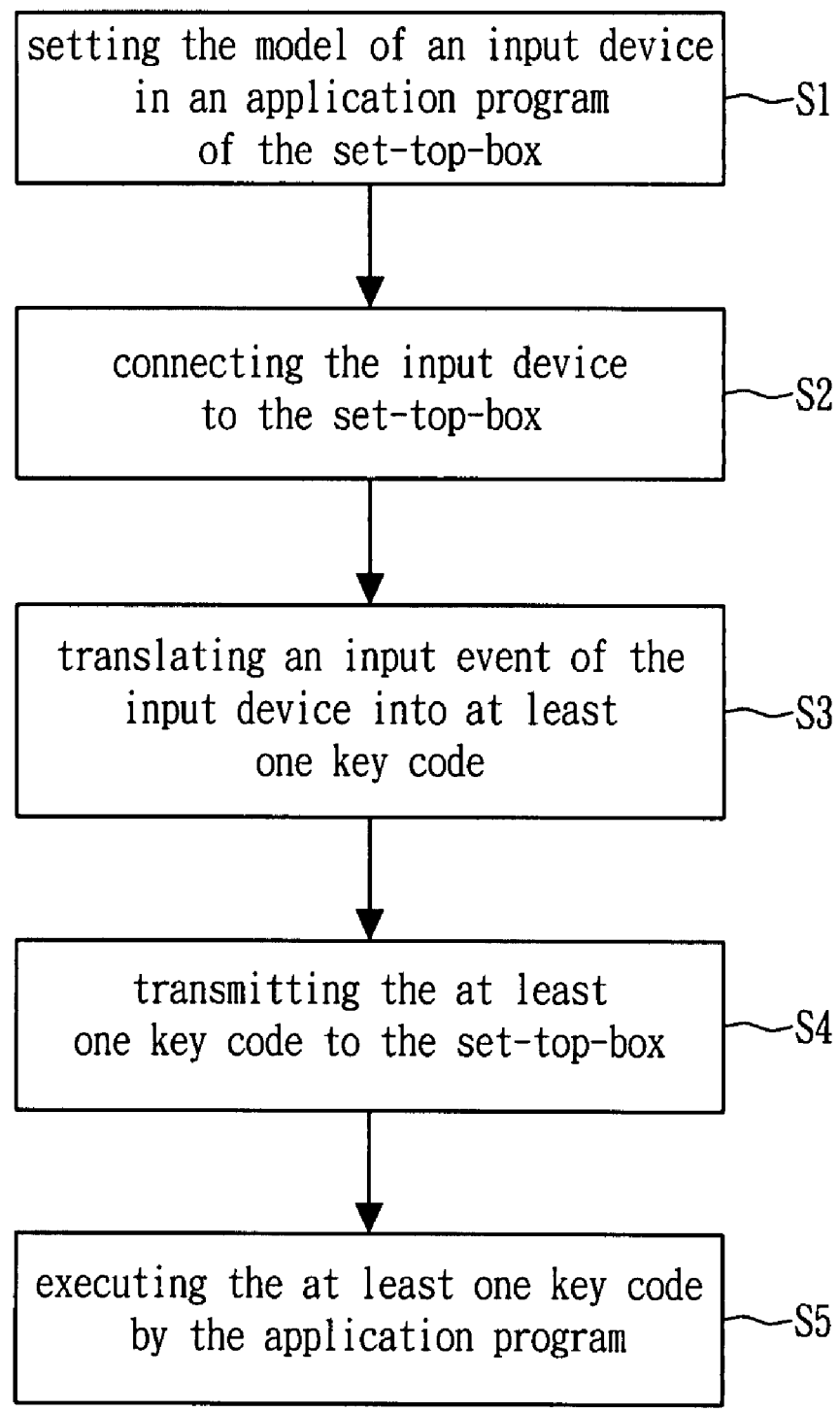
FIG. 3 shows a flow chart in accordance with the method of the present invention.

FIG. 3 shows a flow chart according to the embodiment of the present invention. In step S1, the model of an input device being not any one of the limited applicable input devices is set in an application program of the set-top-box. Therefore, the set-top-box knows what kind of input devices it is connecting to. In step S2, the input device is connected to the set-top-box. The connection could be wire or wireless. In step S3, an input event of the input device is translated into at least one key code, which is recognized by a middleware of the set-top-box for instructing the set-top-box to do something, and the application program is programmed based on the middleware. The translation could be done by checking a look-up table, which is known by persons skilled in the art. In step S4, the at least one key code is transmitted to the set-top-box. In step S5, the at least one key code is executed by an application program so as to control the set-top-box. Under a low-cost consideration, the present invention provides an apparatus and method of controlling a consumer product with limited applicable input devices, which uses input devices other than the limited applicable input devices but needs not add or modify the original hardware of the consumer product and the structure of middleware. The present invention applies a unique key code mapping to translate a variety of the input events of the input devices into recognized key codes defined in the middleware. After the recognized key codes are transferred to the consumer product, an application program, which is programmed based on the middleware and is set up in advance to correspond to the input device, interprets their meaning and drives the consumer product to do what the input device wants.

The above-described embodiments of the present invention are intended to be illustrative only. Numerous alternative embodiments may be devised by persons skilled in the art without departing from the scope of the following claims.

What is claimed is:

1. A method of controlling a consumer product, comprising the steps of:
   setting a model of an input device in an application program of the consumer product, wherein the consumer product has limited applicable input devices pre-programmed into the consumer product, and the input device is not any one of the limited applicable input devices pre-programmed into the consumer product;
   defining the application program, programmed based at least in part on a middleware of the consumer product, for interpreting meanings of received key codes and driving the consumer product to perform functions corresponding to the received key codes;
   connecting the input device to the consumer product;
   detecting input to the input device and generating an input event based upon the type of motion range and number of dimensions of motion of the control means of the input device;
   translating the input event of the input device into at least one key code based upon the type of motion range and the number of dimensions of motion of the control means of the input device, wherein each key code is recognized by the middleware of the consumer product;
   transmitting the at least one key code to the consumer product; and
      wherein the step of translating an input event of the input device into at least one key code comprises the step of:
         translating the input event into the corresponding key code based on a one-to-one mapping if control means of the input device has buttons only, and forwarding the key code to the consumer product;
   executing the at least one key code by the application program so as to control the consumer product.

2. The method according to claim 1, wherein the middleware is one of DVB-MHP (Digital Video Broadcast-Multimedia Home Platform), DCAP (Distributed Control Application Platform) and ARIB (Association of Radio Industries and Business).

3. The method according to claim 1, wherein the step of translating an input event of the input device into at least one key code comprises the steps of:
   dividing a limited motion range of the X-axis by the number of the key codes if control means of the input device has a limited one-dimensional motion range; and
   translating the input event into the corresponding key code according to the position of the input event relating to the divided regions.

4. The method according to claim 1, wherein the step of translating an input event of the input device into at least one key code comprises the steps of:
   dividing the X-axis into n vectors if control means of the input device has an unlimited one-dimensional motion range, wherein n represents the number of the key codes; and
   translating the input event into the corresponding key code according to the position of the input event relating to the divided vectors.

5. The method according to claim 1, wherein the step of translating an input event of the input device into at least one key code comprises the steps of:
   dividing a limited motion range of the X-axis and Y-axis by the number of the key codes, respectively, if control means of the input device has a limited two-dimensional motion range; and
   translating the input event into the corresponding key code according to the position of the input event relating to the divided regions.

6. The method according to claim 1, wherein the step of translating an input event of the input device into at least one key code comprises the steps of:
   dividing the X-axis and Y-axis into n vectors, respectively, if control means of the input device has an unlimited two-dimensional motion range, wherein n represents the number of the key codes; and
   translating the input event into the corresponding key code according to the position of the input event relating to the divided vectors.

7. The method according to claim 1, wherein the step of translating an input event of the input device into at least one key code comprises the steps of:
   dividing a limited motion range of the X-axis, Y-axis and Z-axis by the number of the key codes, respectively, if control means of the input device has a limited three-dimensional motion range; and
   translating the input event into the corresponding key code according to the position of the input event relating to the divided regions.

8. The method according to claim 1, wherein the step of translating an input event of the input device into at least one key code comprises the steps of:
   dividing the X-axis, Y-axis and Z-axis into n vectors, respectively, if control means of the input device has an unlimited three-dimensional motion range, wherein n represents the number of the key codes; and
   translating the input event into the corresponding key code according to the position of the input event relating to the divided vectors.

9. The method according to claim 1, wherein the translation is performed according to a look-up table.

10. The method according to claim 1, wherein the consumer product is a set-top-box.

11. An apparatus of controlling a consumer product, comprising:
   an interface for setting a model of an input device in an application program of the consumer product, wherein the consumer product has limited applicable input devices pre-programmed into the consumer product, and the input device is not any one of the limited applicable input devices pre-programmed into the consumer product;
      wherein the input device for detecting input and generating an input event based upon the type of motion range and number of dimensions of motion of the control means of the input device;
   an input event receiver receiving an input event;
   an input event translator associating the input event of the input event receiver with a plurality of key codes defined by a middleware of the consumer product; and
   a signal transmitter configured to send each of the key codes to the consumer product;
   wherein the application program for interpreting meanings of received key codes and driving the consumer product to perform functions corresponding to the received key codes,
   wherein the input event translator translates the input event into the corresponding key code based on a one-to-one mapping if control means of the input device has buttons only, and forwarding the key code to the consumer product.

12. The apparatus according to claim 11, wherein the middleware is DVB-MHP, DCAP, or ARIB.

13. The apparatus according to claim 11, wherein the consumer product has limited applicable input devices, and the input device is not any one of the limited applicable input devices.

14. The apparatus according to claim 11, wherein the consumer product is a set-top-box.

15. An apparatus of controlling a consumer product, comprising:
an interface for setting a model of an input device in an application program of the consumer product, wherein the consumer product has limited applicable input devices pre-programmed into the consumer product, and the input device is not any one of the limited applicable input devices pre-programmed into the consumer product;
wherein the input device, comprises:
an input event receiver receiving an input event;
an input event translator associating the input event of the input event receiver with a plurality of key codes defined by a middleware of the consumer product based upon the type of motion range and number of dimensions of motion of the control means of the input device;
a remote controller configured to send each of the key codes to the consumer product; and
wherein the input event translator translates the input event into the corresponding key code based on a one-to-one mapping if control means of the input device has buttons only, and forwarding the key code to the consumer product;
a connector configured to connect the input event translator to the remote controller.

16. The apparatus according to claim 15, wherein the middleware is DVB-MHP, DCAP, or ARIB.

17. The apparatus according to claim 15, wherein the consumer product has limited applicable input devices, and the input device is not any one of the limited applicable input devices.

18. The apparatus according to claim 15, wherein the consumer product is a set-top-box.

* * * * *